(12) United States Patent
Ries

(10) Patent No.: US 9,630,657 B2
(45) Date of Patent: Apr. 25, 2017

(54) TIRE SKIRT SYSTEM WITH WINDOW FOR COMPACTOR MACHINE

(71) Applicant: Caterpillar Paving Products Inc., Brooklyn Park, MN (US)

(72) Inventor: Michael William Ries, Coon Rapids, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 32 days.

(21) Appl. No.: 14/595,916

(22) Filed: Jan. 13, 2015

(65) Prior Publication Data
US 2016/0200368 A1 Jul. 14, 2016

(51) Int. Cl.
*E01C 19/26* (2006.01)
*B62D 25/16* (2006.01)
*B62D 25/18* (2006.01)
*E01C 19/23* (2006.01)

(52) U.S. Cl.
CPC ......... *B62D 25/168* (2013.01); *B62D 25/163* (2013.01); *B62D 25/182* (2013.01); *E01C 19/23* (2013.01)

(58) Field of Classification Search
CPC .... E01C 19/23; E01C 2301/00; B62D 25/168
USPC ...................... 404/128; 296/146.15
See application file for complete search history.

(56) References Cited

U.S. PATENT DOCUMENTS

| | | | | |
|---|---|---|---|---|
| 3,891,342 A * | 6/1975 | Roe | .......................... | E02D 3/032 172/547 |
| 5,002,326 A * | 3/1991 | Westfield | .................. | B32B 7/06 160/370.21 |
| 5,592,698 A * | 1/1997 | Woods | ...................... | A42B 3/26 2/424 |
| 5,972,453 A * | 10/1999 | Akiwa | .................... | C09J 7/0207 296/95.1 |
| 6,461,709 B1 * | 10/2002 | Janssen | ..................... | B32B 7/06 156/297 |
| 6,847,492 B2 * | 1/2005 | Wilson | ...................... | A42B 3/26 2/15 |
| 8,088,462 B1 * | 1/2012 | Cockman | .............. | F41H 5/0407 150/166 |
| 8,261,375 B1 * | 9/2012 | Reaux | ................ | A41D 13/1184 128/201.15 |
| 8,322,775 B1 | 12/2012 | Barbee et al. | | |

(Continued)

FOREIGN PATENT DOCUMENTS

CN 203222722 U 10/2013

OTHER PUBLICATIONS

"2011 Caterpillar PS360B for Sale" http://www.constructionequipmentguide.com/used-equipment/caterpillar/cat/PS360B/id/2199572/.*

(Continued)

*Primary Examiner* — Thomas B Will
*Assistant Examiner* — Katherine Chu
(74) *Attorney, Agent, or Firm* — Miller, Matthias & Hull

(57) ABSTRACT

A tire skirt system configured for attachment to a vehicle is disclosed. The system may include a first skirt bracket adapted for attachment to the vehicle, a skirt panel having a first edge adapted for attachment to the first skirt bracket, and a transparent window in the first skirt bracket, the window having an outside face and an inside face. The window may be aligned with at least a portion of a tire when the tire skirt system is attached to the vehicle.

10 Claims, 3 Drawing Sheets

(56) References Cited

U.S. PATENT DOCUMENTS

| | | | |
|---|---|---|---|
| 8,407,938 B2* | 4/2013 | Faria | E05D 15/00 |
| | | | 220/254.2 |
| 8,678,483 B2* | 3/2014 | Quirk | B60J 1/00 |
| | | | 180/69.24 |
| 8,714,869 B1 | 5/2014 | Ries et al. | |
| 2007/0095977 A1* | 5/2007 | Gabrys | B64C 25/32 |
| | | | 244/103 R |
| 2008/0190547 A1 | 8/2008 | White et al. | |
| 2008/0247178 A1 | 10/2008 | Holder | |
| 2008/0292401 A1 | 11/2008 | Potts | |

OTHER PUBLICATIONS

"GRW 280: the state-of-the-art rubber-wheeled roller" Wirtgen Group, Hamm. http://www.hamm.eu/en/products/static-roller/series-grw-280-tier-3/grw-280-28.170090.php, 2015.

* cited by examiner

TIRE SKIRT SYSTEM WITH WINDOW FOR COMPACTOR MACHINE

TECHNICAL FIELD

The present disclosure generally relates to compactor machines and, more particularly, relates to tire skirt systems for compactor machines.

BACKGROUND

A wide variety of machines for paving and compacting asphalt or other paving material have been used for decades. A conventional approach for paving a surface such as a road or parking lot is to distribute hot paving material onto a prepared bed of gravel and/or soil with a paving machine, then to follow the paving machine with one or more compactor machines to compact the material to a desired density and obtain an acceptable surface finish. Completing compaction can often require multiple passes across the mat with a compactor machine.

One such compactor machine is a drum-type compactor having one or more drums adapted to compact the particular surface over which the compactor is being driven. In order to compact the surface, the drum-type compactor may include a drum assembly having a vibratory mechanism that includes inner and outer eccentric weights arranged on rotatable shafts situated within the drum. Both amplitude and frequency of vibration may be controlled to establish degree of compaction.

Another type of compactor machine is a pneumatic wheel roller-style compactor, which is partially dependent upon tire pressure for achieving effective compaction. For successful operation of the pneumatic compactor, the ground contact pressures should be managed in accordance with compaction surface type. Oftentimes, an operator estimates a contact pressure based upon weight of the machine, air pressure of the tires, and compaction conditions in accordance with a chart or other guidelines provided by the machine manufacturer.

Paving material is typically comprised of viscous hydrocarbons, and gravel or the like. The paving material is deposited at a relatively high temperature, and cools to harden into a finished product. It is well known that the hot, viscous hydrocarbon constituents of paving material can stick to machinery. Where paving material sticks to ground contacting parts of the machinery, such as the rotating drums or tires of compactors, the quality of the paving material mat can suffer, and continued operation of the machinery can itself be compromised. This problem is especially noted when the drums or tires of compactors are not at an elevated temperature. For example, if a pneumatic compactor is not warmed-up (i.e., operated) off-site prior to compaction, the tires are too cool and asphalt will stick to the tires, thereby adversely affecting the functioning of the machine and the resulting mat. Recognizing this phenomenon, engineers have developed several ways to address asphalt sticking problems over the years.

For example, systems are available specifically for pneumatic compactors to minimize the amount of asphalt pickup by the tires. One method is to spray water or an emulsion onto the tires to remove the asphalt pickup. Another method involves heating the tires in advance of operation of the pneumatic compactor. Heat retaining tire skirts are also employed to enclose the air surrounding the tires helping to maintain this air at a relatively warm temperature once the tires are heated by operation or by a heating element.

While such tire skirts are effective at maintaining a heated environment for the tires, and thereby reduce asphalt pickup, tire skirts generally block the machine operator's view of the tires. As such, the operator is unable to see where the tires are contacting the ground or mat. Likewise, the operator is unable to see whether the tires are picking up asphalt and therefore marking the mat. Accordingly, it would be beneficial to provide a system for maintaining a heated environment while allowing observation and inspection of the tires by the machine operator.

SUMMARY

In accordance with one aspect of the present disclosure, a tire skirt system configured for attachment to a vehicle is disclosed which may include a first skirt bracket adapted for attachment to the vehicle, a skirt panel having a first edge adapted for attachment to the first skirt bracket, and a transparent window in the first skirt bracket, the window having an outside face and an inside face, wherein the window is aligned with at least a portion of a tire when the tire skirt system is attached to the vehicle.

In accordance with another aspect of the present disclosure, a tire skirt system for attachment to a pneumatic compactor is disclosed which may include an upper skirt bracket adapted for attachment to the compactor, a skirt panel having an upper edge adapted for attachment to the upper skirt bracket, and a transparent window in the upper skirt bracket, wherein the window has an outside face and an inside face, the window being aligned with at least a portion of a tire when the tire skirt system is attached to the compactor, and the inside of the window is provided with a plurality of transparent tear-off sheets configured for removal by an operator of the compactor.

In accordance with another aspect of the present disclosure, a pneumatic compactor is disclosed which includes a frame, a compacting member rotatably coupled to the frame and configured to rotate in contact with a paving material, wherein the compacting member includes a tire, and a tire skirt system including a skirt bracket removably attached to the frame, a skirt panel removably attached to the skirt bracket, and a transparent window in the skirt bracket, the window having an outside face and an inside face, wherein the window is aligned with at least a portion of the tire.

These and other aspects and features of the present disclosure will be better understood when read in conjunction with the accompanying drawings.

While the following detailed description will be given with respect certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto.

DETAILED DESCRIPTION

Figure 1:
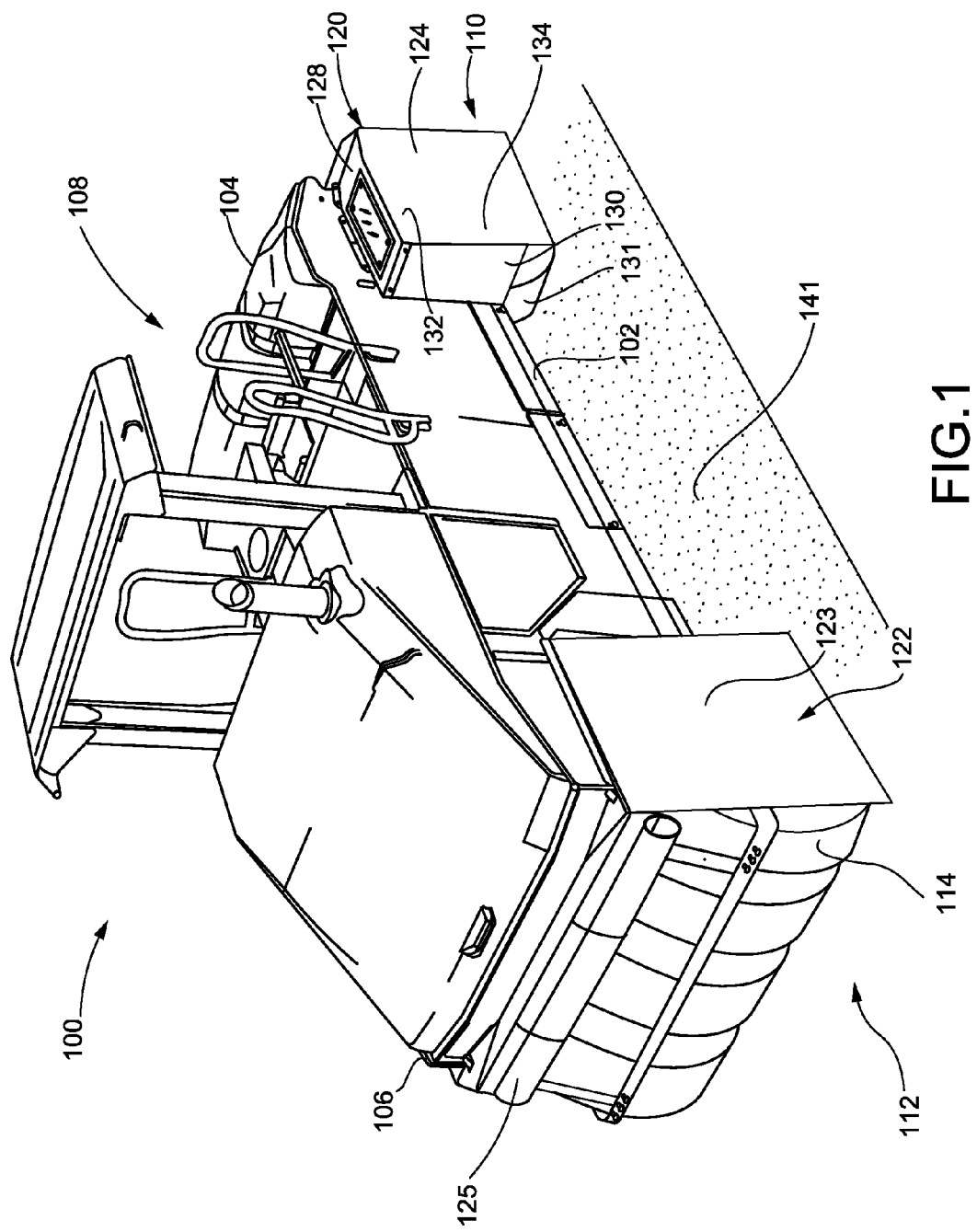
FIG. 1 is a perspective view of a pneumatic compactor machine that embodies elements of the present disclosure.

Referring now to the drawings and with specific reference to FIG. 1, a machine constructed in accordance with the teachings of the present disclosure is generally referred to by reference numeral 100. While the machine 100 is depicted as a pneumatic pavement compactor, it is to be understood that the teachings of this disclosure can be employed with equal efficacy on alternatively powered compactors, e.g., electrical, hydraulic, and mechanical, as well as on compactors for other materials, and on other earthmoving equipment.

The machine 100 includes a frame 102 having a front frame end 104 and a back frame end 106. An operator control station 108 is coupled to frame 102 between the front frame end 104 and the back frame end 106 in a conventional manner. The machine 100 further includes a front compacting member 110 and a rear compacting member 112. Both the front compacting member 110 and the rear compacting member 112 are rotatably coupled to the frame 102 and have an outer surface configured to rotate in contact with a substrate of paving material beneath the machine 100. In the embodiment shown in FIG. 1, both front compacting member 110 and rear compacting member 112 are each made up of four pneumatic tires 114. However, one of skill in the art will appreciate that machine 100 could include any type of compactor employing any type of ground engaging member such as but not limited to, tires, tracks, drums, and rollers. Moreover, while the front compacting member 110 and the rear compacting member 112 are described as having four pneumatic tires 114, front compacting member 110 and rear compacting member 112 could have any number of tires 114, and front compacting member 110 may have a different number of tires 114 than are present in rear compacting member 112.

The machine 100 further includes a front tire skirt system 120 including a skirt 124 for covering and retaining heat around the tires 114 of the front compacting member 110. A rear tire skirt system 122 including a skirt 123 is also included for covering and retaining heat around tires 114 of the rear compacting member 112. The tire skirt systems 120, 122 may be lowered in order to retain heat around the tires 114, or may be raised thereby exposing the tires 114. In the embodiment shown in FIG. 1, a rear panel 125 of the rear tire skirt system 122 may be rolled upward such that the tires 114 are exposed. Additionally, the tire skirt systems 120, 122 may be entirely removable from the machine 100. The material from which the tire skirt systems 120, 122 are manufactured may be generally flexible, having a construction and thickness sufficient to retain a heated environment around heated tires. Examples of skirt panel material may include, but are not limited to, vinyl, canvas and combinations thereof.

Figure 2:
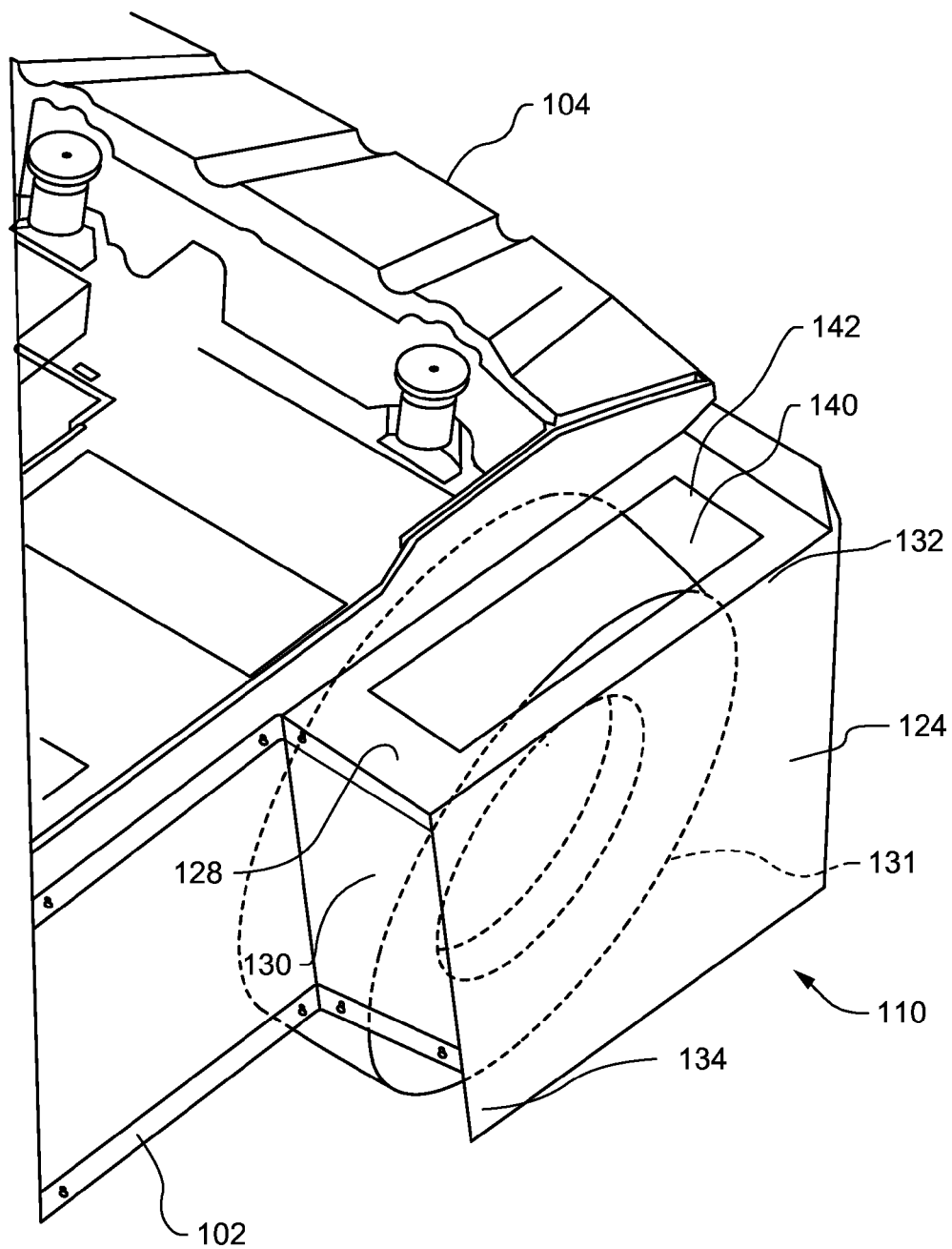
FIG. 2 is an outer perspective view of a portion of the compactor of FIG. 1, showing an enlarged view of a tire skirt system according to the present disclosure.
Figure 3:
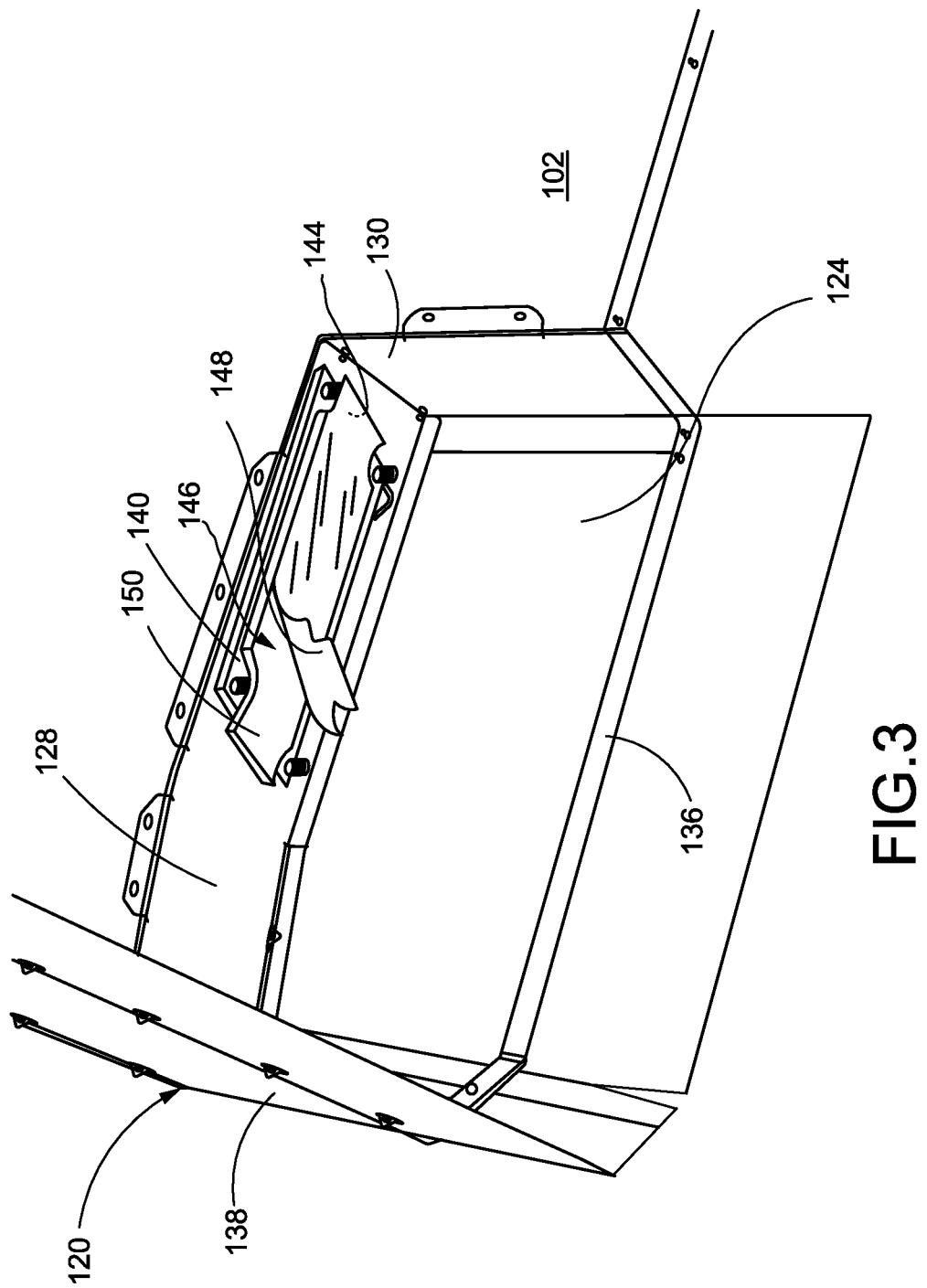
FIG. 3 is an inner perspective view of an inside of a window in a tire skirt system, including tear-off sheets according to the present disclosure.

FIGS. 1, 2 and 3 show a panel 124 of the front tire skirt system 120 in a lowered position. The tire skirt system 120 includes an upper skirt bracket 128 and a side skirt bracket 130 to which the panel 124 of the tire skirt system 120 is attached. The skirt brackets 128, 130 may be removably attached to and extend outward from the frame 102 of the machine 100 in a direction generally perpendicular to the plane of the frame 102. The skirt brackets 128, 130 may comprise the same material as that of the machine frame 102, or may be another generally rigid material. In the depicted embodiments, the skirt brackets 128, 130 extend outwardly far enough from the frame 102 to partially surround an outermost tire 131 that may extend out from under the frame 102 of the machine 100. The skirt panel 124 may be attached by conventional means to the skirt bracket 128 at a top edge 132 of the panel 124, while a side edge 134 of the panel 124 may be attached to the side skirt bracket 130. In addition, the skirt panels 123, 124 may be attached to additional bracket structure 136 to further secure the heat retaining skirts in lowered positions. The panel 124 may extend from the skirt bracket 128 downwardly and beyond the bracket structure 136 to cover tire 131. Alternatively, an additional lower panel may be attached at a lower edge of the panel 124 or to the bracket structure 136. If necessary, this additional lower panel may downwardly extend from the panel 124 or the bracket structure 136 to further cover tire 131.

A front skirt panel 138, as shown in FIG. 3, may be attached to the machine 100 by conventional structure similar to that of panels 123, 124. Likewise, another front tire skirt system 120 may be provided for the tire on the opposite side of the machine 100 (and not depicted in FIG. 2). In this manner, the tires 114 of front compacting member 110 are enclosed by the lowered front tire skirt system 120. One with skill in the art will understand that the skirt panels 124, 138 may be secured to one another to further their function of retaining heat around the tires 114, or that front and side skirt panels may be one unitary unit secured at upper and side edges to the machine frame 102 or brackets 128, 130. In addition, attachment of the skirt panel 124 to the skirt brackets 128, 130, which extend a distance further out from the frame 102 than tire 131, provides for space between the skirt panel 124 and the tire 131. This configuration of the tire skirt system 120 allows the machine 100 to operate, and the tires 114, 131 to rotate, without any interaction or friction between the tire skirt panel 124 and the tires 114, 131.

While the foregoing structure enables heat to be retained proximate the tires 114, 131, but for the teachings of the present disclosure, the tire skirt systems 120, 122 would prevent the operator or another individual from viewing the tires 114, 131. In so doing, the operator would be prevented from seeing if asphalt is sticking to the tires as with the prior art. In at least this regard, the present disclosure drastically improves upon the prior art by providing a window 140.

Referring now to embodiments depicted in FIGS. 2 and 3, the upper skirt bracket 128 may include the window 140 therein. Alternatively, the window 140 may comprise one or more transparent panels secured to an outer side or inner side of upper skirt bracket 128, or the side skirt bracket 130. In the embodiment depicted in FIG. 3, the window 140 is secured by conventional means to the inner side of skirt bracket 128. The window 140 may be generally aligned with at least a portion of the outermost tire 131 beneath the skirt bracket 128, such that an operator of the machine 100 can observe and inspect the tire 131 during operation or otherwise. The window 140 may also allow the operator to see where the tire 131 contacts the ground or mat 141. Likewise, the window 140 may allow the operator to inspect the state of the tire 131, as well as any asphalt or other material accumulating on the tire 131. For the embodiments disclosed herein, the window 140 is an optically clear material, which may include, but is not limited to, an acrylic, glass or polycarbonate material.

The window 140 in the upper skirt bracket 128 includes an outside face 142 opposite an inside face 144 (see FIG. 3). The inside face 144 of window 140 is proximate to and faces the tire 131. Because the inside face 144 of the window 140 is facing the tire 131 and may receive debris from rotating tire 131, the inside face 144 is potentially subject to a substantial amount of buildup on its surface. Such buildup may include dirt, oil, grease, asphalt, etc. This buildup may distort or block the view through the window 140, thereby hindering the operator's ability to observe and inspect the tire 131. In addition, the harsh environmental conditions present at the inside face 144 of the window 140 may potentially damage the window 140 itself.

In order to clear any accumulated buildup on the inside face 144 of window 140, as well as protect the integrity of the window 140, and thereby allow unobstructed viewing of the tire 131, a multi-layered, replaceable stack 146 of transparent, tear-off sheets 148 is disposed on the inside face 144 of the window 140 or innerside of skirt bracket 128. Optionally, each tear-off sheet 148 may be provided with structure enabling individual removal of each tear-off sheet 148 from the multi-layered stack 146. For example, referring to FIG. 3, transparent tear-off sheet 148 in the stack 146 may include a removal tab 150 for grasping by the operator or other individual to facilitate removal and disposal of each tear-off sheet 148 in the stack 146. Therefore, after operation of machine 100 and accumulation of buildup on the outermost tear-off sheet 148, removal of such tear-off sheet 148 from the stack 146 exposes a subsequent clean tear-off sheet 148, thereby clearing the window 140 of its obstructions and providing the operator a clear view of the tire 131. As buildup recurs, this removal of tear-off sheets 148 to clear the window 140 may be repeated until the stack 146 of tear-off sheets 148 expires. At this point, a replacement stack 146 of transparent tear-off sheets 148 may be secured to the window 140 or to the skirt bracket 128.

The stack 146 of transparent tear-off sheets may be secured by conventional contact adhesives or other conventional mechanisms, or be otherwise operatively associated with, the inside face 144 of the window 140 or the innerside of the skirt bracket 128 such that at least a portion of the window 140 is covered by the stack 146 of tear-off sheets 148. Individual tear-off sheets 148 may be bonded together in the stack 146 under a static cling effect, i.e., electrostatic attraction, and/or by using an adhesive between the sheets and around one or more edges of each tear-off sheet 148. Examples of adhesives may include, but are not limited to, acrylics, rubbers, silicones, polyolefins and mixtures thereof. The bonding between individual tear-off sheets 148 is sufficient to prevent premature peeling away of an exposed sheet 148 while allowing easy removal of the tear-off sheet 148 without damaging or losing a subsequent tear-off sheet 148. In addition, the adhesion between individual tear-off sheets 148 is sufficient to prevent debris from entering the multi-layer stack 146 between sheets 148. The tear-off sheets 148 of the present disclosure are transparent and of a flexible material, which may comprise a polymer such as, but not limited to, polyester, polycarbonate, acrylic, polyurethanes, vinyl, other polymers or blends thereof.

While the disclosed tire skirt system 120, including the skirt brackets 128, 130, the skirt panel 124 and the window 140 with tear-off sheets 148, is discussed and depicted with reference to the front compacting member 110 of the compactor machine 100, one with skill in the art will understand the disclosed system as equally applicable to the rear compacting member 112 of the machine 100 as well.

INDUSTRIAL APPLICABILITY

While the above detailed description and drawings are made with reference to a pneumatic compactor machine, it is important to note that the teachings of this disclosure can be employed on other machines used in construction, agriculture and industrial environments or any other movable vehicle where tire skirt systems may be employed.

Referring to the drawings generally, similar to conventional paving practice, compactor machine 100 may follow a separate paver or paving machine distributing asphalt onto a work surface such as a prepared road bed. Prior to beginning compaction of the asphalt, the tires 114 of the machine 100 may be preheated by operation of the machine 100 off-site or using by an independent tire heating element. This heating of tires 114 of the pneumatic compactor machine 100 is needed to help avoid tire pickup of hot asphalt during the compaction process.

In operation, in order to retain a heated environment around the tires 114 and therefore aid in maintaining the tires 114 at an elevated temperature during the compaction process, machine 100 is equipped with heat retaining tire skirt systems 120, 122 for the front compacting member 110 and the rear compacting member 112. As partially depicted in the embodiment of FIG. 1, the heat retaining skirt system 122 for the rear compacting member 112 may include rear skirt panel 125 (shown raised) and side panel 123 (shown lowered). The tire skirt system 120 of front compacting member 110 may include the skirt brackets 128, 130 having the skirt panel 124 attached thereto. This disclosed configuration of the skirt brackets 128, 130 maintains the skirt panel 124 at a distance from the tire 131.

While tire skirt systems are efficient at maintaining a heated environment around tires, observation of rotating tires is not possible using conventional tire skirt systems. The present disclosure therefore provides the window 140 in the skirt bracket 128 in order that the machine operator or another individual may observe and inspect the tires 114, 131 during operation of the machine 100. Such visualization of the tires 114, 131 during operation allows one to see exactly where the tires 114, 131 are contacting the mat 141 and whether or not the tires 114, 131 have any accumulated asphalt pickup. This is further facilitated by aligning the window 140 with at least a portion of the tires 114, 131 with a line of sight of the operator. Multiple windows 140 can be provided for each tire 114, 131 if desired. For example, while the embodiment illustrated includes the window 140 in the upper skirt bracket 128, the side skirt bracket 130 may also or alternatively include a window. Alternatively, the window 140 may span both the upper skirt bracket 128 and the side skirt bracket 130, thereby providing visualization of the tire 131 through both brackets 128, 130 and through the corner where the brackets 128, 130 meet. Likewise, a window may be incorporated into any of the skirt panels, including the skirt panel 124. Such a window in the skirt panel 124 would allow additional observation of another surface of the tire 131 by someone walking along beside the machine 100 during operation. Window 140 may also span one or more brackets 128, 130 and skirt panel 124, thereby providing visualization of the tire 131 through a bracket, the skirt panel and through the corner where the bracket and skirt panel meet. Alternatively, one or both of the skirt brackets 128, 130 may be constructed from a rigid, transparent material and thereby function as a window onto the tire 131.

During operation of the machine 100, the window 140 is likely to accumulate buildup on its inside face 144 due to its direct exposure to debris from the rotating tire 131. The embodiment shown in FIG. 3 therefore provides a solution for such buildup, specifically, a multi-layered stack 146 of transparent tear-off sheets 148 secured to the inside face 144 of the window 140 or the innerside of the skirt bracket 128.

After operation of the machine 100 and accumulation of buildup that blocks the operator's view through window 140, the operator or other individual may raise the skirt panel 124 and remove the outermost, soiled tear-off sheet 148 from stack 146, thereby exposing a subsequent clean tear-off sheet and clearing any obstruction from the inside face 144 of window 140. Thereafter, the compaction operation may resume until the operator needs to again clear window 140 by removing another tear-off sheet. Once the stack 146 of tear-off sheets expires, the window 140 can then be equipped with an additional, replacement stack 146 of tear-off sheets 148. The disclosed tear-off sheets 148 provide a quick and easy way for the one to clear the window 140 and therefore observe the tires 114, 131 during operation. In addition, the tear-off sheets 148 help to protect the window 140 and reduce the need for any costly and time consuming repair and/or replacement of the window 140.

The present disclosure thus provides an altogether new strategy for operating a pneumatic compactor equipped with heat-retaining tire skirts. While it has been known to use tire skirt systems in the context of pneumatic compactor machines, employment of these skirts has typically blocked the operator's view of the compacting tires and required an operator's best guess as to where the outermost tires are contacting the ground, as well as to the operating state of the tires with regard to asphalt pickup. This may in turn compromise the quality of the mat and the safety of the operator. Therefore, in the context of pneumatic compactors, the present disclosure offers a far more efficient operating strategy where see-through tire skirt systems are employed rather than simply relying on an operator's best guess.

All references to the disclosure or examples thereof are intended to reference the particular example being discussed at that point and are not intended to imply any limitation as to the scope of the disclosure more generally. Additionally, those skilled in the art will appreciate that various modifications might be made to the presently disclosed embodiments without departing from the full and fair scope of the present disclosure.

What is claimed is:

1. A pneumatic compactor, comprising:
   a frame;
   an operator station coupled to the frame;
   a compacting member rotatably coupled to the frame and configured to rotate in contact with a paving material, wherein the compacting member includes a tire, and wherein at least a portion of the tire protrudes from beneath the frame and is within a direct line of sight of an operator in the operator station;
   a tire skirt system including a skirt bracket attached to the frame, a skirt panel attached to the skirt bracket, and a transparent window in the skirt bracket, the window having an outside face and an inside face, and wherein the window is aligned with at least a portion of the tire and is configured to provide the operator with a direct line of sight to at least a portion of the tire while operating the compactor; and
   a plurality of transparent tear-off sheets disposed at the inside face of the window and at least partially covering the window, the tear-off sheets configured for individual removal.

2. The pneumatic compactor of claim 1, wherein the skirt bracket extends in a direction generally perpendicular to the frame at a distance greater than that of the protruding portion of the tire, and the skirt panel is spaced away from the frame at a distance greater than that of the protruding portion of the tire.

3. The pneumatic compactor of claim 1, wherein the window is located vertically above the tire.

4. The pneumatic compactor of claim 1, wherein the tire skirt system is removable.

5. The pneumatic compactor of claim 1, wherein the plurality of tear-off sheets is replaceable.

6. The pneumatic compactor of claim 1, wherein the tear-off sheets are bonded together by an adhesive disposed at one or more edges of the tear-off sheets.

7. The pneumatic compactor of claim 1, wherein the tear-off sheets include a removal tab.

8. The pneumatic compactor of claim 1, wherein the tire skirt system further comprises a second skirt bracket adapted for attachment to the frame, the skirt panel adapted for attachment to the second skirt bracket.

9. The pneumatic compactor of claim 8, further comprising a transparent side window in the second skirt bracket, the side window having an outside face and an inside face, and wherein the side window is aligned with at least a portion of the tire.

10. The pneumatic compactor of claim 9, further comprising a plurality of transparent tear-off sheets disposed at the inside face of the side window and configured for individual removal.

* * * * *